United States Patent Office 3,450,469
Patented June 17, 1969

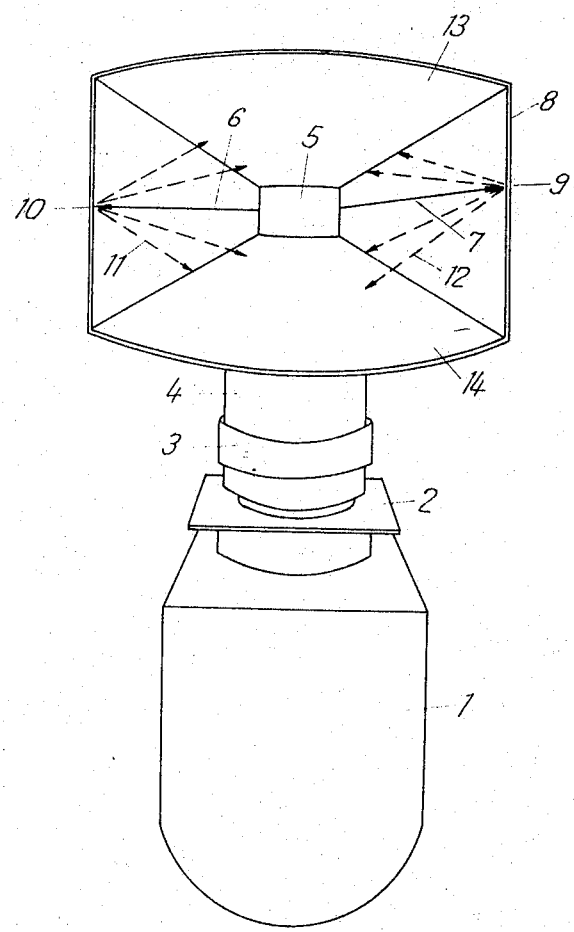

3,450,469
PANORAMIC OPTICAL PROJECTION SYSTEM
Heinz Brachvogel, Cologne-Klettenberg, Germany, assignor to Volpi AG, Zurich, Switzerland
Filed July 15, 1966, Ser. No. 565,573
Claims priority, application Germany, Nov. 30, 1965,
B 84,764
Int. Cl. G03b 21/00
U.S. Cl. 352—69                                       2 Claims

ABSTRACT OF THE DISCLOSURE

A panoramic projection system includes a projector arranged to project an image for panoramic projection to a panorama lens positioned centrally within a cylindrical projecting screen or similar projecting surface. The construction includes a conical diaphragm arranged on each side of the lens so that harmful radiation which reduces the quality of projection is suppressed. The projected rays which are directed outwardly from each side end of the lens are deflected by the conical lens on each side thereof. A cone angle of the diaphragms is complementary to the angle of the panorama projection angle so that harmful light radiating from the cylindrical projection surface is absorbed and rendered ineffective.

---

This invention relates in general to optical systems and in particular to a new and useful panoramic optical projection system having a diaphragm constructed and arranged to absorb harmful light radiation returning from the projection surface.

In panorama-optical projections over an angle of 360°, the panorama image is projected from the center onto the projection surface. The technical and optical means for accomplishing the projection are known and the projection surface depends on the purpose of the projection. Such a projection surface may be spherical in form or deviate from the spherical form. In general, the projection surfaces have a cylindrical form and comprise projection screens, ground glass plates or cylindrical plate holders which are charged with photosensitive materials. The projection screens serve for visual observation and the plates and plate holders are used for photodocumentary production. In all types of projections of panorama image from the center, the light rays strike the projection surface from the inside. Depending on the finish of the projection screen or surface, a diffusion takes place on this surface of a major part of the projection light reflected into the interior. This stray light passes through the interior and arrives on the opposite side of the projection surface. It is obvious that this bright light has a disturbing and harmful effect on the surface since it causes faulty exposure and reduces the brilliance and contrast of the originally projected image.

In those instances where the panorama projection is visually effected on the interior, the reduction of the contrast and brilliance seems tolerable because of the accommodation of the eye and also because of the viewing angles. But such defects are quite obvious with an objective effect, for example, and the exposure of a photosensitive photo material of a film or paper tape which surrounds the panorama lens cylindrically and which, for example, is embedded in a plate holder. In such an instance, harmful stray light causes a complete faulty exposure and spoils the anticipated picture. Similar conditions appear in the panorama projection by a cylindrical or spherical round glass plate, where the image is viewed from the outside but projected from the inside onto the ground glass plate in which case the image becomes softened and with a reduced contrast. Additional stray light reduces the picture quality which is related to the ground glass plane by a still further and considerable extent.

In accordance with the present invention, the undesirable effects enumerated above are substantially eliminated by the introduction of a diaphragm arrangement which comprises two conical diaphragms arranged in respect to the panoramic lens to absorb the undesirable reflected light. The diaphragms act to receive the light and to absorb it to an extent that the remaining stray light which cannot be eliminated can have no noticeable influence on the picture quality.

A further object of the invention is to provide a panoramic projection system in which means are provided for absorbing harmful light radiation from the projection screen.

A further object of the invention is to provide a panoramic photographic device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

The only figure of the drawings is a partial elevational and partial sectional view of a panoramic optical projection system constructed in accordance with the invention.

Referring to the drawing in particular, the invention embodied therein comprises a panoramic projection system which includes a projector housing which includes a lamp (not shown). The projector 1 includes a filter and condenser 2 and a panorama slide with a 360° panorama image at 3. Means for focusing the projection objective is indicated at 4 and a panorama lens 5 is centrally located within a projection screen or cylindrical projection surface 8.

Light projected outwardly from the lens 5 in the form of beams 6 and 7 issues and strikes the projecting surface 8 at the points 9 and 10. At the points 9 and 10 there is formed a diffused reflection which reflects the light into the projection space as illustrated by the rays 11 and 12. This reflected light is absorbed by the light absorbing surface on the conical diaphragms 13 and 14 which are provided on each side of the panoramic lens 5 in accordance with the invention. The conical diaphragms prevent the light from striking the opposite projecting surface and thus causing faulty exposures.

The cones 13 and 14 are arranged substantially apex to apex and are provided with a passage or a bore for the insertion of the panoramic lens 5. The cone angle of the diaphragms depends on the angular ratio of the projection angle of the panorama lens 5. This projection angle must not be admitted by the diaphragms 13 and 14 because this would result in an interruption of the projection beam. The maximum effect is achieved, however, when the conical diaphragms 13 and 14 are arranged above and below (or on each side of) the lens 5 and form the complement to the projection angle. In such an arrangement, the sides of the projection angle coincide with the surface of a diaphragm. These surfaces are coated with a known means or design so that they have a light absorbing effect so that any light impinging upon them is no longer reflected.

In this case, the stray light is completely prevented in the meridional section of the reflection beam from arriving at the opposite projection surface. In the sagittal section, the screening acts on the upper and lower beams extending in the range of the conical bodies. A practically complete screening effect is achieved on obliquely upwardly and downwardly extending skew beams from the diffused reflection. No screening is possible with reflection beams extending inside the projection angles.

While a specific embodiment of the invention has been shown and described in detail to illustrate the application of the inventive principles, it will be understood that the invention may be embodied otherwise without departing from such principles.

What is claimed is:

1. A panoramic optical projection system comprising a cylindrical projection surface, a panoramic lens oriented with respect to said projection surface to project a panoramic image thereon, and conical diaphragm located on each side of said lens having a light absorbing surface with cone angle complementary to the angle of the panorama projection angle so that the harmful light radiation returning from said cylindrical projection surface will be absorbed and rendered ineffective in the meridional section and the skew radiation is made ineffective to a great extent in the sagittal section whereby to prevent faulty exposure and to insure contrast and brilliance in the projected image.

2. A device according to claim 1, wherein said conical diaphragms are arranged substantially apex to apex and have an opening defined adjacent the respective apexes thereof for accommodating said panoramic lens.

References Cited

UNITED STATES PATENTS

| | | | |
|---|---|---|---|
| 2,926,561 | 3/1960 | Keeble | 352—69 |
| 3,229,576 | 1/1966 | Rees. | |
| 2,273,074 | 2/1942 | Waller | 350—125 |

FOREIGN PATENTS

| | | |
|---|---|---|
| 350,678 | 6/1931 | Great Britain. |
| 988,094 | 4/1965 | Great Britain. |
| 1,026,870 | 4/1966 | Great Britain. |

JULIA E. COINER, *Primary Examiner.*

U.S. Cl. X.R.

350—117; 352—104; 353—79